United States Patent [19]
Morley et al.

[11] 3,810,528
[45] May 14, 1974

[54] TURBINE WITH LUBRICANT TANKS IN CENTRE BODY AND HOUSING

[75] Inventors: Charles Gordon Morley, Hemel Hempstead; Basil Charles James Stevenson, Warwicks; Llewellyn James Bedder, Coventry; Arthur Henry Wells, Warwicks, all of England

[73] Assignee: Lucas Aerospace Limited, Birmingham, England

[22] Filed: Nov. 2, 1972

[21] Appl. No.: 303,276

[30] Foreign Application Priority Data
Nov. 4, 1971    Great Britain.................. 51316/71

[52] U.S. Cl................ 184/6.11, 60/39.08, 415/110, 184/6.12
[51] Int. Cl.............................................. F16n 7/02
[58] Field of Search ......... 60/39.08; 184/6.11, 6.12, 184/13 R; 415/112, 110

[56] References Cited
UNITED STATES PATENTS

| | | | |
|---|---|---|---|
| 3,248,880 | 5/1966 | Hull et al........................... | 184/6.11 |
| 3,692,146 | 9/1972 | Butler............................... | 184/6.11 |
| 3,618,711 | 11/1971 | Vollmer............................ | 184/6.12 |
| 2,474,258 | 6/1949 | Kroon............................... | 60/39.08 |
| 3,074,688 | 1/1963 | DeMuth............................ | 184/6.11 |
| 2,874,803 | 2/1959 | Gunberg........................... | 60/39.08 |

FOREIGN PATENTS OR APPLICATIONS

| | | | |
|---|---|---|---|
| 658,044 | 10/1951 | Great Britain..................... | 184/6.11 |
| 659,569 | 10/1951 | Great Britain..................... | 184/6.11 |

*Primary Examiner*—Carlton R. Croyle
*Assistant Examiner*—Warren Olsen

[57] ABSTRACT

A turbine power unit includes a peripherally bladed turbine wheel coupled to the input member of a gear box which is accommodated within a casing. The casing in use contains oil which is supplied to the bearings of the gear box by a pump. The device also includes a centre body which forms the motive fluid stream into annular form, the centre body also being hollow and constituting an oil reservoir. An additional reservoir is provided intermediate the turbine wheel and the gearbox, the two reservoirs serving to receive a substantial portion of the oil contained within the casing when the device is in use.

4 Claims, 1 Drawing Figure

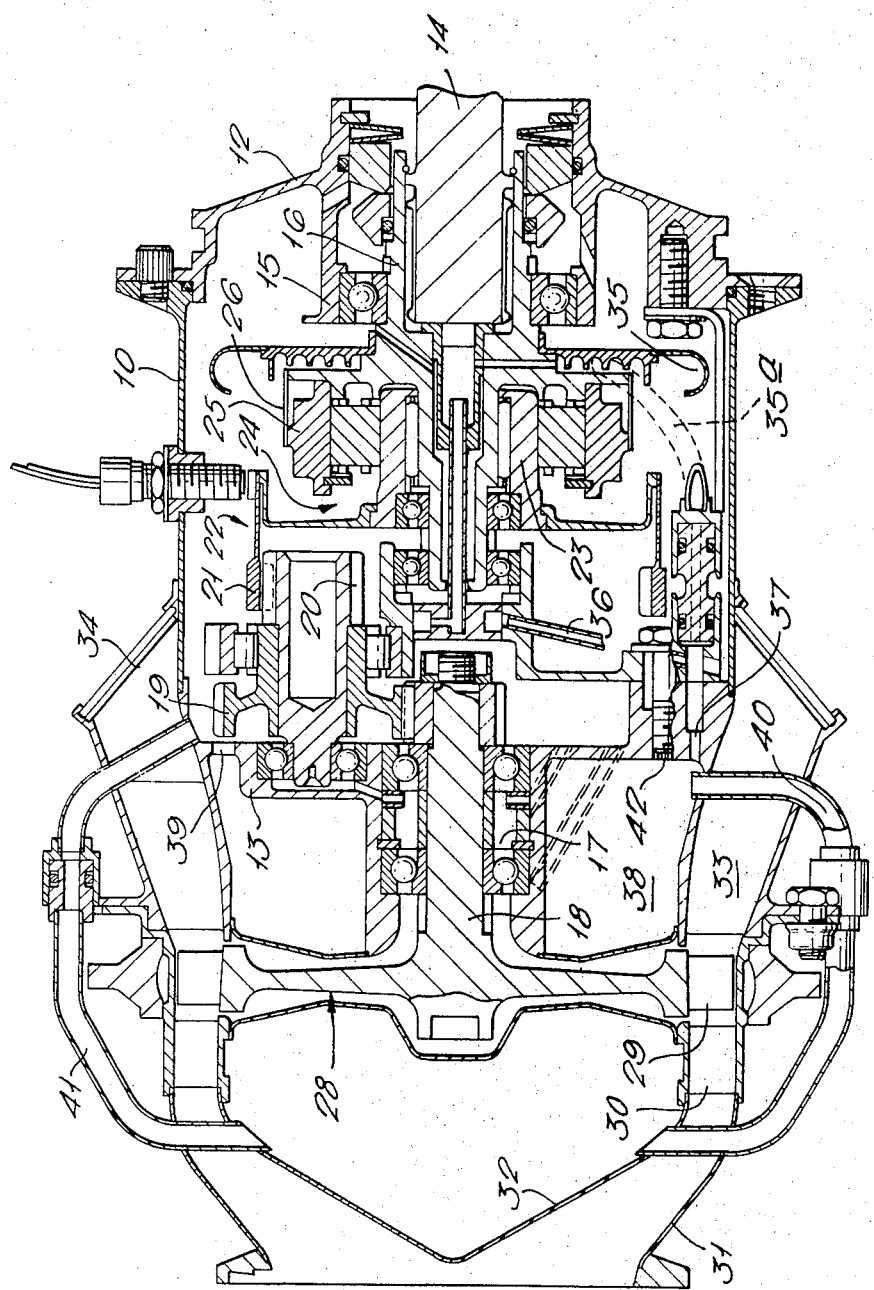

TURBINE WITH LUBRICANT TANKS IN CENTRE BODY AND HOUSING

This invention relates to turbine power units and particularly to such units which are intended for use when starting an internal combustion engine, the unit comprising a turbine wheel having blades mounted on its periphery, a ring of guide vanes disposed to direct the motive fluid onto the blades, an inlet casing structure defining an inlet for the motive fluid and a centre body which forms the fluid stream entering the inlet into annular form, a housing, bearings in the housing for supporting an input shaft carrying the turbine wheel, an output shaft extending from the housing a reduction gear box mounted within the housing and interconnecting the input and output shafts and pump means for circulating lubricant contained within the housing to the bearings within the housing.

With such devices the amount of lubricant which can be retained within a given size of housing is limited with the result that due to leakage of the lubricant, the number of hours which the unit can operate without attention, is limited. This difficulty can be overcome by providing a lubricant storage tank separate from the unit, however, this, particularly in an aircraft installation, is a disadvantage since the unit unless the tank is secured to the unit means that the unit is not self contained.

The object of the invention is to provide a unit of the kind specified in a simple and convenient form.

According to the invention in a unit of the kind specified lubricant is stored in a tank defined by the aforesaid centre body and in a further tank positioned in the space defined between the housing and the turbine wheel.

One example of a turbine power unit in accordance with the invention will now be described with reference to the accompanying drawing which shows a sectional side elevation of the device.

With reference to the drawing there is provided a housing 10 having end closures 12 and 13. End closure 12 mounts an output shaft 14 which is located within an output member 16 supported by a bearing 15. An oil seal is disposed intermediate the output member and the end closure, the oil seal including a pair of co-operating silicon nitride rings in sealing relationship with the output member and end closure respectively and loaded into engagement by a pair of dished washers.

The other end closure carries bearings 17 which support an input shaft 18. The latter is coupled to a pinion which meshes with three gear wheels 19 only one of which is shown. The gear wheels are coupled to further gear wheels 20 respectively which mesh with gear teeth formed on an annulus 21. The annulus 21 is coupled by means of a fabricated and flexible coupling member 22 to the inner member 23 of a one way clutch 24, the inner member of the clutch being rotatable about the output member 16. The output member 25 of the clutch is coupled to the output member 16 through a flange formed on the latter, the periphery of which is coupled to the member 25 by way of a flexible coupling member 26, this being secured to the outer member 25 intermediate the end faces thereof.

The input shaft 18 mounts a turbine wheel 28 having turbine blades 29. The wheel is located within a casing portion which includes an annular row of guide blades 30, an inlet portion 31 having a flange for connection to a source of fluid under pressure and a centre body 32. The centre body 32 forms the incoming fluid stream into annular form for its entry into the nozzle section defined by the blades 30. The fluid after impinging on the turbine blades 29 passes between fixed blades 33 mounted on the end closure 13 to an annular outlet 34 about the housing.

In operation fluid under pressure for instance air, flows through the nozzle section and causes rotation of the turbine wheel. The turbine wheel rotates at a high speed and the gearing reduces this speed to the desired value. The clutch 24 locks when the turbine wheel is driving the output shaft but when the supply of fluid is cut off, the output shaft can continue to rotate.

Various lubricant passages are provided within the housing to permit lubricant to be supplied to the bearings and gears. The pump for supplying the lubricant is a simple form of pick-up pump which comprises a pick up tube extending into a rotating trough containing the lubricant. The trough is formed by a member 35 which is mounted on the output member 16. The normal lubricant level in the housing is above the level of the lip of the member 35 so that as the member rotates a trough of lubricant will be formed. The pick-up tube shown in dotted outline at 35a is connected through to the various bearings such as shown at 36 in the drawings and a restricted opening 37 is provided into a tank 38 defined in the space between the turbine wheel 28 and the end closure 13. At its upper end the tank 38 is provided with a vent 39 into the housing. A further tank is defined by the interior of the centre body 32 and this is coupled to the tank 38 by a lower connecting pipe 40 and to the interior of the casing by an upper connecting or vent pipe 41.

The arrangement is such that when the turbine is at rest the level of oil within the tanks and the housing is just below the level of the oil seal on the output shaft. In operation however the level of oil within the housing falls and the displaced oil is fed to the tanks. In this manner severe churning of the oil is avoided. The reduced churning of the oil reduces the heat generated and thereby the oil temperature. The oil in the tanks is cooled by the passage of air through the turbine and a steady flow of the cooled oil flows back into the gear box housing by way of a bleed hole 42 near the bottom of the tank 38. In operation only surplus oil is fed to the tanks through the restricted opening 37 any loss of lubricant from the gearbox casing is made good by this circulation without the use of valves.

By the arrangement described all the lubricant is contained within the unit and the service life thereof is extended.

We claim:

1. A turbine power unit comprising a turbine wheel having blades mounted on its periphery, a ring of guide vanes disposed to direct the motive fluid on to the blades, an inlet casing structure defining an inlet for the motive fluid, a centre body disposed in the inlet said centre body forming the fluid stream entering the inlet into annular form, a housing, an input shaft located in the housing, bearings for supporting the input shaft, said turbine wheel being mounted on said input shaft, an output shaft extending from the housing, a reduction gearbox mounted within the housing and interconnecting the input and output shafts, pump means for supplying lubricant to the bearings and gear reduction mechanism, a lubricant tank defined by the aforesaid centre body and a further lubricant tank positioned in the space defined between the housing and the turbine wheel, passage means interconnecting said tanks, and restricted passage means through which some of the lubricant contained in the housing is displaced into said tanks during the initial operation of the turbine.

2. A power unit as claimed in claim 1 including a bleed hole from one of the tanks to the interior of the housing and through which lubricant is returned to the housing.

3. A power unit as claimed in claim 2 in which said bleed hole is positioned near the bottom of said one tank.

4. A power unit as claimed in claim 3 including means venting the upper portions of said tanks to the interior of the housing.

* * * * *